United States Patent Office.

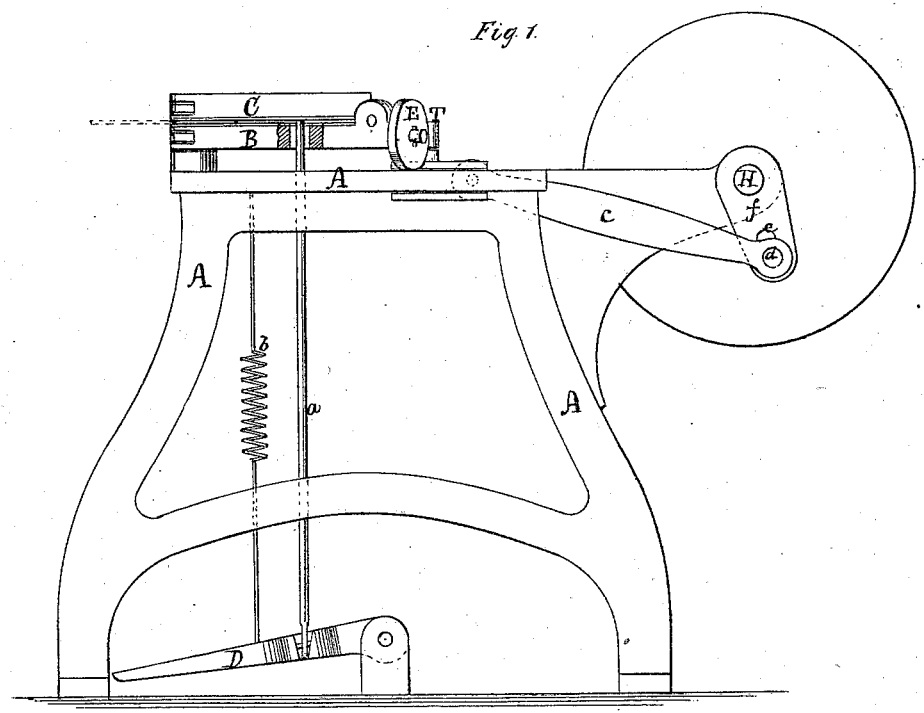
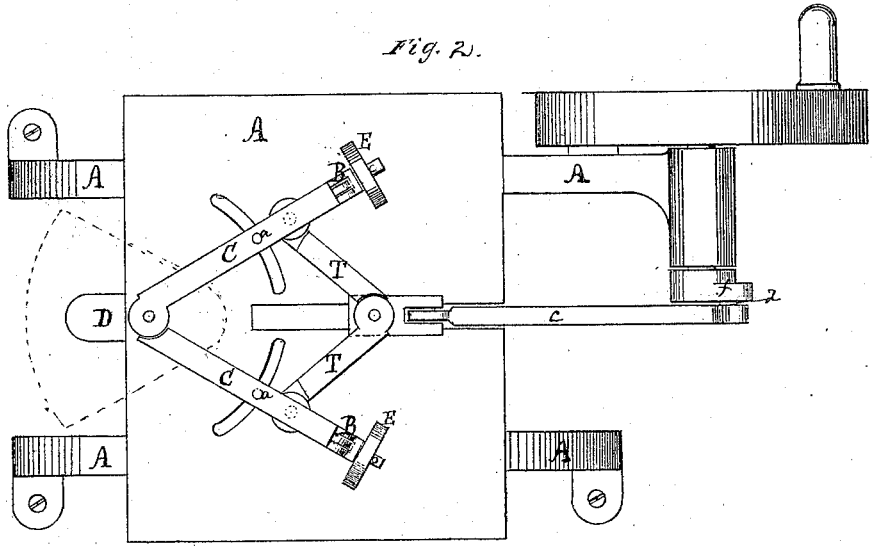

AUGUSTUS PELISSE, OF NEWARK, NEW JERSEY, ASSIGNOR, FOR ONE-FOURTH, TO WARREN A. CHILDS, OF SAME PLACE.

Letters Patent No. 98,624, dated January 4, 1870.

IMPROVEMENT IN MACHINES FOR STRETCHING HATS.

The Schedule referred to in these Letters Patent and making part of the same.

*To all whom it may concern:*

Be it known that I, AUGUSTUS PELISSE, of Newark, in the county of Essex, and State of New Jersey, have invented a new and useful Improvement in Machinery for Stretching Hat-Bodies; and I hereby declare that the following is a full, clear, and exact description thereof, reference being had to the accompanying drawing, which forms part of this specification.

The object of this invention is to provide mechanism, whereby a hat-body may be stretched whilst in a folded state, in a manner similar to the way the operation is at present performed by hand.

All the machines for stretching hat-bodies, of which I have any knowledge, are so constructed that the hat-body is stretched by intervening arms, ribs, or their equivalents, the hat-body being in an open state while being stretched.

Such mechanism corrugates the hat-body, and these corrugations show distinctly in the hat after it has been finished, and hence a serious objection arises to the use of such machines.

The present invention consists in a method of stretching a hat-body, whilst in a folded state, by means of laterally-moving jaws, whereby the hat-body is stretched in a manner similar to the operation of stretching, as performed by hand, and therefore I am enabled to obtain, by machinery, the very satisfactory results produced by hand not heretofore accomplished by machinery.

In the accompanying drawings—

Figure 1 is a side elevation of a machine containing by said improvements.

Figure 2 is a plan or top view thereof.

A designates a table, upon the top of which I have shown the stretching-mechanism as arranged.

B B designate two arms hinged or pivoted together at one end, and arranged to open laterally from each other. These hinged arms I shall hereinafter refer to as jaws B.

To these jaws B, another pair of similar jaws C is hinged, in such manner that the two pairs of jaws B C will close together at their apexes.

The hat-body is to be placed between these jaws B C, as will be understood by reference to fig. 2.

The means shown for drawing the one pair of jaws C down upon the other pair B, consists of a treadle, D, which is connected to the jaws C by means of rods $a\ a$, so that by the depression of the treadle by the foot, the jaws C will close down on the jaws B, and clamp the hat-body, whilst, and so long as the treadle is depressed.

A spring-rod, $b$, or any other suitable means may be employed for keeping the jaws C in a position to receive a hat-body.

Rollers E E are shown as applied to the ends of the jaws B B, to assist in keeping the jaws horizontal, but such rollers may or may not be employed as desired.

The mechanism I have shown for opening the jaws B C laterally and closing them, consists of toggle arms T, attached to the lower pair of jaws B, which toggle is actuated by means of a pitman-rod, $c$, attached to a crank-pin, $d$, which slides in a slot, $e$, in a crank, $f$, attached to the driving-shaft H, the said driving-shaft being driven by any suitable power.

I have shown this toggle-mechanism as well adapted for the purpose, but any well-known or suitable mechanism for opening and closing the jaws, may be employed.

The operation of the machine will be easily understood.

In order to stretch the tip of a hat-body, the latter is placed upon the jaws B, and the jaws C are caused to clamp it tightly by depressing the treadle with the foot.

This being done, the toggle-arms are straightened, and this opens the jaws laterally, and therefore the felt or material of the hat-body is stretched outward, as is at present done by hand.

On the jaws being closed laterally, the treadle is released and raised by means of the spring $b$, until the jaws have been moved to their narrowest opening point, when the felt is again introduced and the operation repeated.

The brim may be stretched in the same mannner.

If it be found that some hat-bodies do not require to be stretched as much as others, the extent of the stretching can be regulated by the time the hat-body is clamped between the jaws B C by the depression of the treadle, as is obvious.

What I claim as my invention, and desire to secure by Letters Patent, is—

1. The method of stretching a hat-body whilst in a folded state, by means of a pair of clamping-jaws opening laterally, substantially as herein specified.

2. The combination of the jaws C, with those B, operating in the manner substantially as herein specified.

3. The combination, with the jaws B C, of the treadle D, and connecting-rods $a\ a$, or their equivalents, for clamping and holding the hat-body whilst the same is being stretched, substantially as herein specified.

4. The combination, with the jaws B, of the toggle T, arms B, connecting-rod $c$, and crank $f$, substantially as and for the purpose herein specified.

AUGUSTUS PELISSE.

Witnesses:
T. B. BEECHER,
M. M. LIVINGSTON.